No. 760,549. PATENTED MAY 24, 1904.
F. R. McBERTY.
PLUG AND SPRING JACK SWITCH.
APPLICATION FILED JAN. 6, 1900.
NO MODEL. 2 SHEETS—SHEET 1.

Witnesses:
J. W. Skinkle.
W. W. H. Leach.

Inventor:
Frank R. McBerty
By George P. Barton
Attorney.

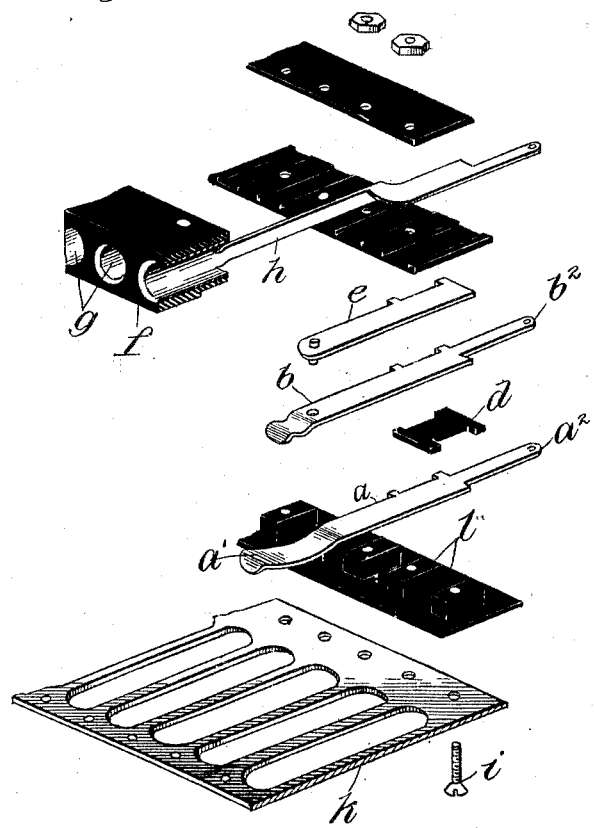

No. 760,549.                                                                     Patented May 24, 1904.

UNITED STATES PATENT OFFICE.

FRANK R. McBERTY, OF EVANSTON, ILLINOIS, ASSIGNOR TO THE WESTERN ELECTRIC COMPANY, OF CHICAGO, ILLINOIS, A CORPORATION OF ILLINOIS.

PLUG AND SPRING-JACK SWITCH.

SPECIFICATION forming part of Letters Patent No. 760,549, dated May 24, 1904.

Application filed January 6, 1900. Serial No. 533. (No model.)

*To all whom it may concern:*

Be it known that I, FRANK R. McBERTY, a citizen of the United States, residing at Evanston, in the county of Cook and State of Illinois, have invented a certain new and useful Improvement in Plug and Spring-Jack Switches, of which the following is a full, clear, concise, and exact description.

My invention relates to plug and spring-jack switches such as are used in switchboards of telephone-exchanges; and its object is to provide an improved switching mechanism which will be compact, durable, and reliable and in which the several steps in the insertion of the plug may be accomplished without liability of false contacts.

My invention will be described by reference to the accompanying drawings, illustrating the preferred embodiment thereof, and the parts, improvements, or combinations considered to be novel will be pointed out in the appended claims.

Figure 1:
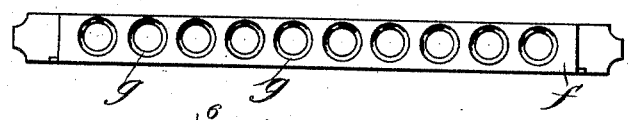
Figure 2:
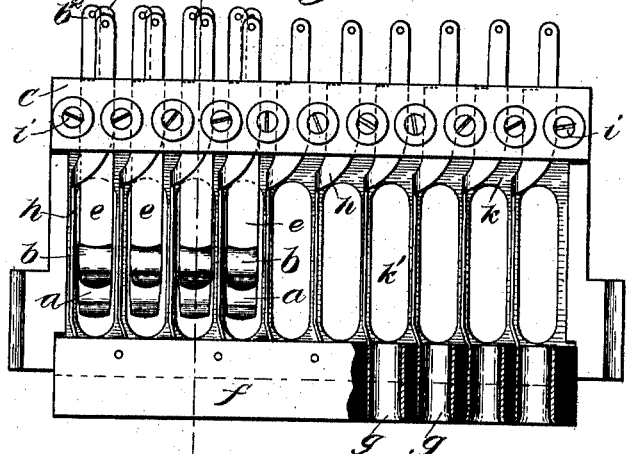
Figure 3:
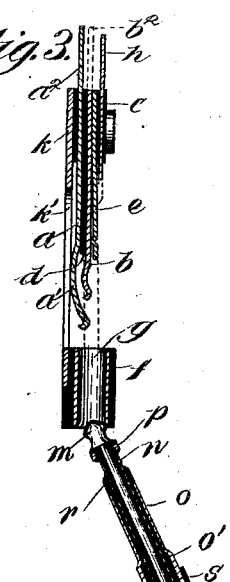
Figure 4:
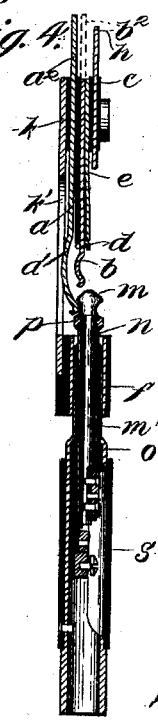
Figure 5:
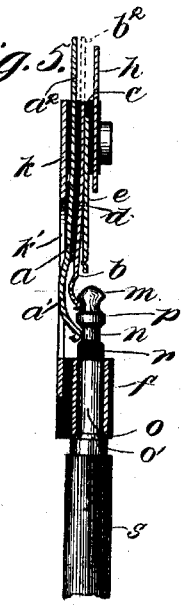

Figure 1 is an elevation of a block of ten spring-jacks of my invention. Fig. 2 is a plan view thereof, partially in section. Figs. 3, 4, and 5 are sections on line 6 6 of Fig. 2, the plug being shown in its several stages of insertion into the spring-jack. Fig. 6 is a detail view illustrating the manner of assembling the different parts of a strip of spring-jacks.

The long and the short line-springs $a$ $b$ are mounted one above the other in a rear insulating-strip $c$, their projecting ends $a^2$ and $b^2$ being formed to receive the wires going to the substations or other parts of the board, and the contact-points thereof are bent to fit into their respective places on the plug and hold the same in position until forcibly withdrawn. A strip of hard rubber $d$, extending for some distance between the two springs $a$ $b$, tends to keep them apart while the plug is being inserted. A stop $e$, which preferably has very little elasticity, is associated with the short line-spring $b$ and tends to hold both the long and the short line-springs in position to be most easily engaged by their respective plug-contacts. This stop $e$ is preferably mounted in the block $c$ directly upon the short line-spring $b$ and need not be insulated therefrom, as it has no electrical connection with any of the lines, its rigidity being employed to better advantages when associated directly with the spring. I prefer to use German silver in the construction of the line-springs.

In order that the frame of the spring-jacks may be made as thin as possible, the shorter line-spring $b$ is mounted nearly in alinement with the central axis of the thimble $g$ of the jack, and in order that it may fit over the rounded head of the plug said line-spring is arched or provided with a double curve, as shown most clearly in Figs. 3, 4, and 5. The longer line-spring is also arched or provided with an outward curve $a'$ to clear the arched portion of the inner spring and prevent any possible contact between the two springs while the plug is being inserted. By virtue of these peculiar bends in the springs the strip of spring-jacks can be made thinner than would otherwise be possible.

The thimble $g$ of the jack, which is embedded in a block of insulating material $f$, has an extension $h$ placed at the side of the line-springs $a$ $b$ and bent at its extremity, so as to pass through the block $c$ in a plane parallel to the line-springs, but in no electrical connection therewith. It will at once be seen that this method of arranging the extension of the thimble will prevent any liability of contact being made between it and either of the springs or with the plug when inserted on account of accidental bending, as it is in such a position that it cannot be reached by anything which would tend to injure its shape.

The insulating-support $c$ for the line-springs and the extensions $h$ of the test-thimbles are composed of strips of hard rubber, between which the metal parts are inserted, the lower insulating-strip preferably having transverse grooves $l$ $l$ therein adapted to receive the line-springs and the other insulating-strips serving to separate the metal parts from one another. The several parts are held firmly together by screw-bolts $i$ $i$, forming practically a single strip or block which supports and insulates the metal parts of the jack at the rear. It is convenient to refer to this rear support as the "rear" strip, although it may be built up of several strips or parts fastened together. These two blocks $c$ and $f$ are mounted on a piece of sheet metal $k$, which may be of brass, having openings or slots $k'$ therein adapted to allow the curve $a'$ of the long line-spring $a$ free movement during the insertion of the plug.

The construction of spring-jacks herein described is especially advantageous in that it admits of a very compact arrangement of the parts, whereby a large number of spring-jacks may be assembled in small compass.

The plug which forms a part of my invention differs from those in general use in several particulars, the most important features of which I will set forth. The tip $m$ is preferably made of aluminium-bronze composition and is connected to the line-wires by means of a narrow rod $m'$, passing within the plug. The ring contact $n$ is composed of a small metal tube surrounding the rod $m'$, but insulated therefrom, and is itself embedded in insulating material, separating it from the shank $o$ of the plug. A metal ring or shoulder $p$ is supplied between the tip and ring contacts, embedded in hard rubber, which is adapted to take up the wear that would cut away the soft insulating material. The diameter of this shoulder is the same as that of the shank of the plug, and each is adapted to fit snugly in the thimble of the jack, while not being too large to prevent entering freely. A special feature of my invention is the relative diameters of the tip and the shoulder insulated therefrom, the tip being of a considerably smaller diameter, the especial advantage of which will be explained shortly. The ring contact is also of a relatively small diameter. The rubber insulation surrounding the ring contact is enlarged about its outward extremity to form the shoulder $r$ of the same diameter as the shank of the plug, which prevents the long spring from making contact between the ring and shank contacts of the plug and is of great importance in preventing the tip and shank from making connection at the same time with the thimble of the spring-jack, as will be described. The shank $o$ is enlarged to form a shoulder $o'$, which is adapted to engage the outward extremity of the thimble of the jack, and thereby prevent the plug from entering too far into the spring-jack. The heel of the plug is enveloped by a layer of insulation $s$, which serves to protect the plug from objectionable contacts.

Having thus described the features and construction of my invention, I will proceed to point out in detail how it will eliminate all chance of undesirable contacts in the operation of insertion and removal of the plug from the spring-jack.

The principal difficulty in the past has been met at the first stage of inserting a plug into the jack of a line. The tip of the plug is first touched to the thimble of the jack to find whether or not the called line is busy, and if the line was not in use the plug was pushed into the jack. Upon inserting my plug into its spring-jack the tip makes contact with the thimble, as usual, and when the plug is inserted farther, so that the shoulder $p$ is also inserted, the tip may still make contact if the plug is at an angle. When the hard-rubber shoulder $r$ comes into engagement with the outer end of the thimble, the metal and hard-rubber shoulders being, as stated, of such a diameter as to fit snugly into the thimble, the axis of the plug is thrown in direct line with the axis of the thimble of the spring-jack, and thus forces the tip exactly in the central part of the thimble. The shank of the plug now coming into contact with the outer extremity of the thimble increases the bearing-surface and does not permit of any rocking which would allow the tip to make contact.

I have done away with the other objections which were previously mentioned by making the tip of my plug of a shorter length than the distance between the contact-points of the two line-springs or the distance between the contact-point of the long line-spring and the thimble of the spring-jack. It will also be seen by referring to Fig. 4 that the metal shoulder $p$ will prevent the tip from bridging the long line-spring and the thimble and in addition will prevent the tip and ring contacts of a plug from being short-circuited by the metallic parts of a spring-jack during the insertion of the plug therein.

Having thus described my invention, I claim as new, and desire to secure by Letters Patent, the following:

1. In a spring-jack, the combination with a flexible line-spring, a flat and rigid metal stop therefor in a plane parallel to the line-spring and in contact therewith, a metal base-plate and strips of insulating material thereon having transverse grooves in which the said spring and stop lie, and means for securing the stop, spring and insulating-strips to the base-plate, as described.

2. In a spring-jack, the combination with two line-springs of different lengths and an intervening insulating-piece, of a flat metal strip of a length nearly equal to the short line-spring and lying in contact therewith beneath the spring, and an insulating-support for said line-springs and strip at the rear of the jack, substantially as set forth.

3. A strip of spring-jacks comprising a supporting-plate $k$ with front and rear insulating-strips carried thereby, thimbles $g$ in transverse holes in the front insulating-strip, long and short line-springs insulated from one another and supported by the rear strip, the shorter line-spring of each spring-jack being mounted substantially in alinement with the axis of the thimble and being curved at its end to fit over the rounded tip of an inserted plug, said longer line-spring being arched over the curved portion of the short spring, the arched portions of said line-springs lying at the side of the axis of the thimble toward said supporting web or plate $k$, said plate being cut away to clear the arched portion of said longer line-spring.

4. In a switchboard-plug, the combination with the tip $m$ and the contact ring or sleeve $n$, of a metal insulated ring between the tip and sleeve to take the wear, as described.

5. The combination with a spring-jack having a long and a short line-spring and a metallic thimble, of a plug adapted for insertion in the spring-jack, tip, ring and shank contacts $m\ n\ o$ for the plug, said tip and ring contacts being of smaller diameter than the shank, and a ring $p$ on the plug between the tip and ring contacts, of substantially the diameter of the shank, and fitting snugly into the thimble of the jack, whereby short circuits between the contacts of the plug while it is being inserted in the jack are prevented, substantially as described.

6. The combination in a strip of spring-jacks, of a metal base-plate and a strip of insulating material mounted thereon near each edge thereof, metal thimbles in transverse perforations of one insulating-strip, each of said thimbles having an extension which is transverse to the strip of jacks in a plane perpendicular to the base-plate between the strips and in a plane parallel with the base-plate where it passes the other strip of insulating material, two line-springs with an intervening tongue of insulating material, and a flat metal stop beneath one of the line-springs of each spring-jack in electrical connection therewith, said stop, line-springs and extension of the thimble lying parallel in the transverse grooves of said other strip of insulating material, and means for securing the springs and extension in the groove, as described.

7. A switchboard-plug comprising tip, ring and shank contacts distributed at intervals along the axis of the plug and insulated from one another, said tip and ring contacts being of smaller diameter than the shank, and a metal collar between the tip and ring contacts and insulated therefrom, said collar being of substantially the same outside diameter as the shank.

8. In a strip of spring-jacks, the combination with front and rear insulating-strips, metal thimbles inserted transversely in the front strip, line-springs supported in the rear strip and extending forward in alinement with said thimbles, and extension-tongues $h$ for said thimbles leading from the side thereof and bent at a point intermediate of the front and rear strips to pass through the rear strip above and in a plane parallel to the line-springs, substantially as set forth.

9. A switchboard-plug having tip and ring contacts distributed at intervals along the axis of the plug, and insulated from one another, and an insulated metal ring adapted to take the wear lying between said contacts, said ring being of greater diameter than either of said contacts; whereby short-circuiting of the contacts is prevented.

10. The combination with a spring-jack having two contact-springs, a plug and two contact portions carried thereby adapted to engage said springs, respectively, and an enlarged insulated metallic collar between the contact portions of the plug, said collar having no electrical connection with said spring-jack when the plug is inserted.

11. The combination with a spring-jack comprising a test-thimble and two contact-springs having contact portions at different distances from the rear of said thimble, of a plug having tip, ring and shank contacts adapted to engage with said contact-springs and said test-thimble respectively, and an insulated metal collar between the tip and ring contacts of the plug and of greater diameter than either, said collar having no electrical connection with the spring-jack when the plug is inserted.

In witness whereof I hereunto subscribe my name this 17th day of November, A. D. 1899.

FRANK R. McBERTY.

Witnesses:
GEORGE P. BARTON,
J. W. SKINKLE.